United States Patent
Webb

(10) Patent No.: US 6,308,395 B1
(45) Date of Patent: Oct. 30, 2001

(54) SWIVEL INSERT REMOTE CONTROL ASSEMBLY AND METHOD OF MAKING SAME

(75) Inventor: Grant A. Webb, Howell, MI (US)

(73) Assignee: Teleflex Incorporated, Inc., Plymouth Meeting, PA (US)

( * ) Notice: Subject to any disclaimer, the term of this patent is extended or adjusted under 35 U.S.C. 154(b) by 0 days.

(21) Appl. No.: 09/572,221

(22) Filed: May 17, 2000

Related U.S. Application Data

(62) Division of application No. 09/324,069, filed on Jun. 1, 1999, now Pat. No. 6,119,543.

(51) Int. Cl.⁷ .................................................. B23P 11/02
(52) U.S. Cl. ........................... 29/453; 29/441.1; 29/450; 74/502.4; 74/502.6; 264/274
(58) Field of Search ........................ 74/500.5, 501.5 R, 74/502, 502.4, 502.5, 502.6; 285/261, 921; 29/453, 437, 441.1, 450, 527.1; 264/274

(56) References Cited

U.S. PATENT DOCUMENTS

| | | | |
|---|---|---|---|
| 3,081,497 | * 3/1963 | Scherry | 264/274 |
| 3,994,185 | 11/1976 | Gilardi | 74/501 |
| 4,380,178 | 4/1983 | Bennett et al. | 74/501 |
| 4,649,010 | 3/1987 | Bennett et al. | 264/242 |
| 4,769,198 | * 9/1988 | Bechtold et al. | 264/274 |
| 4,988,472 | * 1/1991 | Orimoto et al. | 264/274 |
| 5,529,743 | * 6/1996 | Powell | 264/274 |

* cited by examiner

*Primary Examiner*—David P. Bryant
*Assistant Examiner*—Jermie E. Cozart
(74) *Attorney, Agent, or Firm*—Howard & Howard

(57) ABSTRACT

A flexible motion transmitting core element (12) is attached a rod (14) and a conduit (16) movably supports the core element (12) and has an end portion to which is attached an end fitting (18). An insert (20) has a neck portion (22) embedded in the end fitting (18) and a spherical portion (24) presenting a ball-shaped pocket and extending from said neck portion (22) through a maximum inner diameter D. A swivel tube (26) has a bore therethrough for movably supporting the rod (14) and has a convex spherical surface (28) slidably supported in the ball-shaped pocket for swiveling movement relative to the end fitting (18). The end fitting (18) embeds only a portion of the spherical portion (24) of the insert (20) for allowing the open end (30) to move radially to snap the convex spherical surface (28) of the swivel tube (26) into the ball-shaped pocket of the insert (20). The insert (20) includes an anchor flange (32) for anchoring the insert (20) in the end fitting (18).

6 Claims, 1 Drawing Sheet

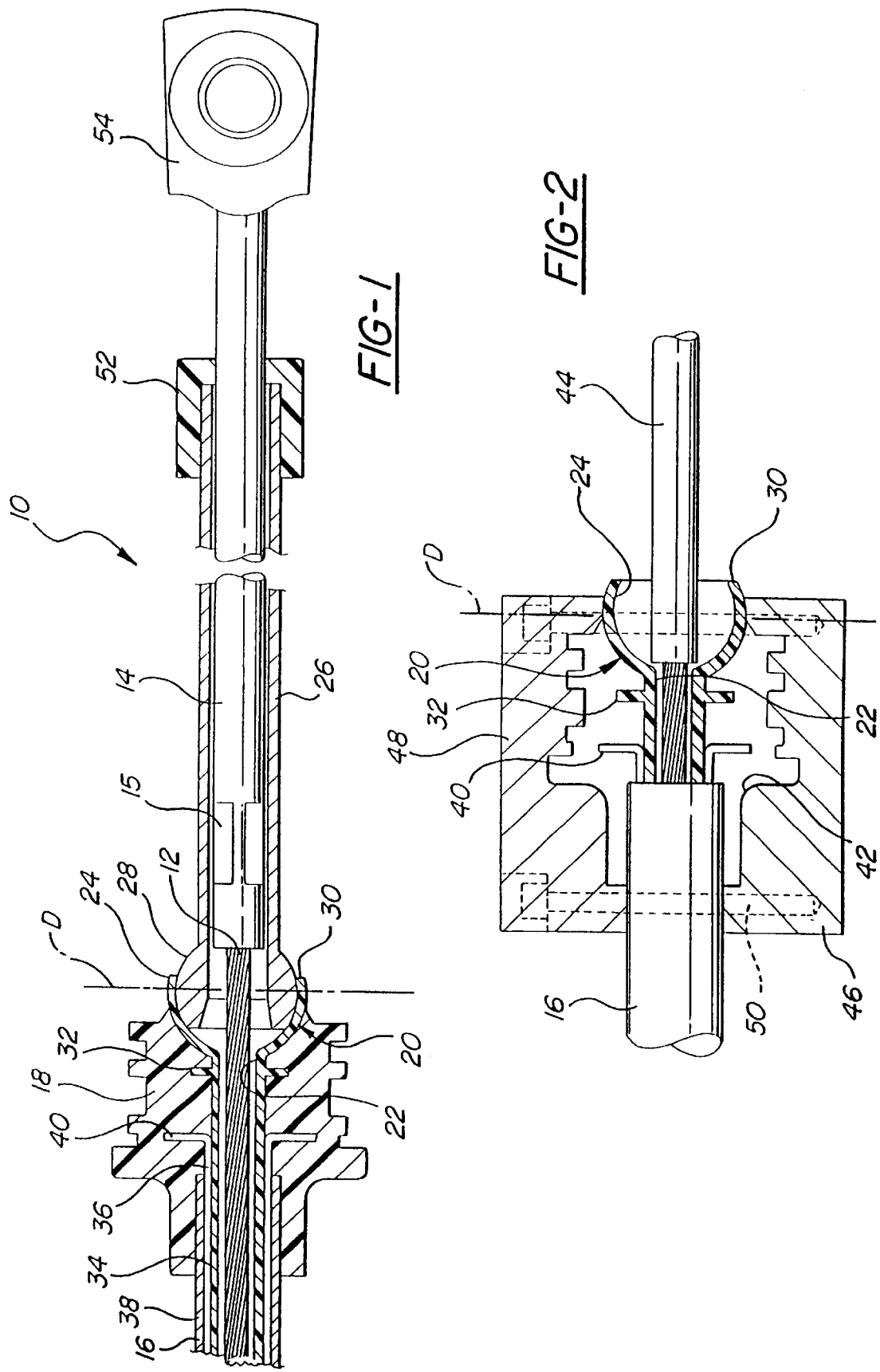

SWIVEL INSERT REMOTE CONTROL ASSEMBLY AND METHOD OF MAKING SAME

This application is a divisional of application Ser. No. 09/324,069, filed Jun. 1, 1999, now U.S. Pat. No. 6,119,543.

BACKGROUND OF THE INVENTION

1. Field of the Invention

The subject invention relates to a motion transmitting remote control assembly of the type for transmitting motion in a curved path by a flexible motion transmitting core element. More specifically, the invention relates to such a control assembly wherein a swivel tube is supported by an end fitting for swivelling movement as a rod attached to the core element moves to and fro in the swivel tube.

2. Description of the Prior Art

In order to overcome problems in the molding of the end fitting about the male convex spherical end of the swivel tube, an insert has been embedded in the end fitting for engaging and supporting the spherical end of the swivel tube. Such an solution is disclosed in co-pendinig U.S. Pat. Nos. 4,380,178 and 4,649,010, both in the names of Bennett et al. and assigned to the assignee of the subject invention. In accordance with the solution disclosed therein, the end fitting is molded sufficiently about the spherical end of the swivel tube to prevent the swivel tube from being removed from the assembly and/or requires the swivel tube to be assembled in place when the end fitting is molded about the insert and swivel tube. An alternative construction is to mold an end fitting without an insert and sized so that the male spherical end of the swivel tube is snapped into the spherical pocket in the end fitting. There remains a need to mold an end fitting about the insert while allowing the spherical end of the swivel tube to be assembled with the insert in a later operation.

SUMMARY OF THE INVENTION AND ADVANTAGES

A motion transmitting remote control assembly including a flexible motion transmitting core element having a terminal portion and a rod attached to the terminal portion of the core element. A conduit movably supports the core element and has an end portion with an end fitting disposed about the end portion of the conduit. An insert has a neck portion embedded in the end fitting and a spherical portion presenting a ball-shaped pocket and extending from the neck portion through a maximum inner diameter. A swivel tube has a bore therethrough for movably supporting the rod and has a convex spherical surface slidably supported in the ball-shaped pocket for swiveling movement relative to the end fitting. The assembly is characterized by the spherical portion extending from the maximum inner diameter to an open end which is smaller than the maximum inner diameter and smaller than the convex spherical surface for engaging and retaining the convex spherical surface of the swivel tube in the ball-shaped pocket.

The method is therefore characterized by the steps of placing the end portion of the conduit and the insert in a mold cavity with the mold cavity terminating at least at the maximum inner diameter for leaving the insert out of the mold cavity between the maximum inner diameter and the open end, and injecting organic polymeric material into the mold cavity for molding the end fitting about the end portion of the conduit and about the insert from the neck portion to a position not beyond the maximum inner diameter of the spherical portion.

Accordingly, the subject invention provides an insert molded into the end fitting but which can receive and retain the spherical end of the swivel tube in a later assembly operation.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a longitudinal view partially in cross section and showing a preferred embodiment of the subject invention; and FIG. 2 is a cross sectional view showing a mold assembly for making the preferred embodiment in accordance with the method of the subject invention.

DETAILED DESCRIPTION OF THE PREFERRED EMBODIMENT

Referring to the Figures, wherein like numerals indicate like or corresponding parts throughout the several views, a motion transmitting remote control assembly made in accordance with the subject invention is generally shown at 10.

The assembly 10 includes a flexible motion transmitting core element 12 having a terminal or end portion to which is attached a rod 14 by a crimp 15. The core element 12 comprises a plurality of threads wound together to define a cable but may comprise a wire. A conduit 16 movably supports the core element 12 and has an end portion to which is attached an end fitting 18 as the end fitting 18 is disposed about the end portion of the conduit 16.

The assembly includes an insert, generally indicated at 20, having a neck portion 22 embedded in the end fitting 18 and a spherical portion 24 presenting a ball-shaped pocket and extending from said neck portion 22 through a maximum inner diameter D. A swivel tube 26 has a bore therethrough for movably supporting the rod 14 and has a convex spherical surface 28 slidably supported in the ball-shaped pocket for swiveling movement relative to the end fitting 18.

The assembly 10 is characterized by the spherical portion 24 extending from the maximum inner diameter D to an open end 30 which is smaller in diameter than the maximum inner diameter D and smaller than the convex spherical surface 28 for engaging and retaining the convex spherical surface 28 of the swivel tube 26 in the ball-shaped pocket. More specifically, the end fitting 18 embeds a portion of the spherical portion 24 of the insert 20 for allowing the open end 30 to move radially to snap the convex spherical surface 28 of the swivel tube 26 into the ball-shaped pocket of the insert 20. The end fitting 18 terminates at least at or before the maximum inner diameter as it extends from the neck portion 22 for leaving the insert 20 free of radial restraint between the maximum inner diameter D and the open end 30.

The insert 20 includes an anchor 32 for anchoring the insert 20 in the end fitting 18. The anchor 32 comprises a radially extending flange embedded in the end fitting 18. In other words, the end fitting 18 extends to smaller diameters on either side of the flange to prevent relative axial movement between the end fitting 18 and the insert 20, i.e., to prevent the insert 20 from being withdrawn from the end fitting 18.

The neck portion 22 of the insert 20 abuts the end of the conduit 16. More specifically, the conduit 16 comprises an inner tubular liner 34 surrounded by load carrying filaments 36 and a casing 38 encasing 38 the filaments 36 with the neck portion 22 abutting the inner tubular liner 34. The casing 38 terminates in longitudinally spaced relationship to the neck portion 22 to expose the filaments 36 to the end fitting 18. The filaments 36 have flared end portions 40 extending radially into the end fitting 18 for retention of the end fitting 18 on the conduit 16.

The end fitting 18 consists of organic polymeric material and said insert 20 consists of a metal, although the insert 20 can also consist of organic polymeric material, but with the end fitting 18 molded about the insert 20.

The invention, therefore, also encompasses a method of making such a motion transmitting remote control assembly which is characterized by the steps of placing the end portion of the conduit 16 and the insert 20 in a mold cavity 42 with the mold cavity 42 terminating at least at the maximum inner diameter D for leaving the insert 20 out of the mold cavity 42 between the maximum inner diameter D and the open end 30, and injecting organic polymeric material into the mold cavity 42 for molding the end fitting 18 about the end portion of the conduit 16 and about the insert 20 from the neck portion 22 to a position not beyond the maximum inner diameter D of the spherical portion. As alluded to above, the method is further defined as forming an anchor 32 on the neck portion 22 of the insert 20 and molding the end fitting 18 into mechanical interlocking engagement with the anchor 32 to prevent the insert 20 from being withdrawn from the end fitting 18. This step is further defined as forming a flange extending radially from the neck portion 22 of the insert 20 and molding the end fitting 18 into mechanical interlocking engagement with the flange to prevent the insert 20 from being removed from the end fitting 18.

The method is further defined as flaring a portion 40 of the end portion of the conduit 16 radially outward and molding the end fitting 18 about the flared portion 40 to embed the flared portion 401 in the end fitting 18. The method includes the placing of the end portion of the conduit 16 into abutting relationship with the neck portion 22 of the insert 20 in the mold cavity 42 and inserting a mandrel 44 into the portion 22 and the conduit 16 before injecting organic polymeric material into the cavity 42.

After the end fitting 18 is molded about the end portion of the conduit 16, the method of assembly includes the step of snapping the convex spherical surface 28 of the swivel tube 26 through the open end 30 of the insert 20 and into the ball-shaped pocket for retention therein as the open end 30 moves radially outward to allow the larger convex spherical surface to pass therethrough.

The mold comprises two parts or lower and tipper halves 46 and 48 with pegs 50 aligning the two mold parts. The cavity in the mold parts 46 and 48 extends to a position where the mold parts 46 and 48 engage the insert 20 in or diametrically in a plane which corresponds with the maximum diameter D of the insert 20.

An end cap 52 is disposed on the distal end of the swivel tube 26 and the rod 14 has a terminal 54 for attachment to a control member.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A method of making a motion transmitting remote control assembly which includes a flexible motion transmitting core element (12) having a terminal portion, a conduit (16) for movable supporting the core element (12) and having an end portion, an end fitting (18) disposed about the end portion of the conduit (16), a rod (14) attached to the terminal portion of the core element (12), a swivel tube (26) having a bore therethrough for swiveling movement relative to the end fitting (18) and movably supporting the rod (14), the swivel tube (26) having a convex spherical surface (28) for mating engagement with and support in a ball-shaped pocket defined by an insert (20) having a neck portion (22) embedded in the end fitting (18) and a spherical portion (24) defining the ball-shaped pocket and extending from the neck portion (22) through and defining a maximum diameter D to an open end (30) of smaller diameter, said method characterized by the steps of placing the end portion of the conduit (16) and the insert (20) in a mold cavity (42) with the mold cavity (42) terminating no further than at the maximum inner diameter D for leaving part of the spherical portion of insert (20) out of the mold cavity (42) between the maximum inner diameter D and the open end (30), and injecting organic polymeric material into the mold cavity (42) for molding the end fitting (18) about the end portion of the conduit (16) and about the insert (20) from the neck portion (22) to a position not beyond the maximum inner diameter D of the spherical portion (24).

2. A method as set forth in claim 1 further defined as forming an anchor (32) on the neck portion (22) of the insert (20) and molding the end fitting (18) into mechanical interlocking engagement with the anchor (32) to prevent the insert (20) from being withdrawn from the end fitting (18).

3. A method as set forth in claim 2 further defined as flaring a portion (40) of the end portion of the conduit (16) radially outward and molding the end fitting (18) about the flared portion (40) to embed the flared portion (40) in the end fitting (18).

4. A method as set forth in claim 1 further defined as forming a flange extending radially from the neck portion (22) of the insert (20) and molding the end fitting (18) into mechanical interlocking engagement with the flange to prevent the insert (20) from being removed from the end fitting (18).

5. A method as set forth in claim 1 including the step of snapping the convex spherical surface (28) of the swivel tube (26) through the open end (30) of the insert (20) and into the ball-shaped pocket for retention therein as said open end (30) moves radially outward to allow the larger convex spherical surface (28) to pass therethrough.

6. A method as set forth in claim 1 further defined as placing the end portion of the conduit (16) into abutting relationship with the neck of the insert (20) in the mold cavity (42), inserting a mandrel (44) into the neck and the conduit (16) before injecting organic polymeric material into the cavity.

* * * * *